US012650586B2

(12) United States Patent
Zhang et al.

(10) Patent No.: US 12,650,586 B2
(45) Date of Patent: Jun. 9, 2026

(54) MICROSCOPIC DEVICES AND FOCUSING METHODS THEREOF

(71) Applicant: SHANGHAI RUIYU BIOTECH CO., LTD., Shanghai (CN)

(72) Inventors: Xiaojia Zhang, Shanghai (CN); Puwen Luo, Shanghai (CN)

(73) Assignee: SHANGHAI RUIYU BIOTECH CO., LTD., Shanghai (CN)

( * ) Notice: Subject to any disclaimer, the term of this patent is extended or adjusted under 35 U.S.C. 154(b) by 333 days.

(21) Appl. No.: 18/361,809

(22) Filed: Jul. 28, 2023

(65) Prior Publication Data

US 2023/0367112 A1 Nov. 16, 2023

Related U.S. Application Data

(63) Continuation of application No. PCT/CN2021/130342, filed on Nov. 12, 2021.

(30) Foreign Application Priority Data

Jan. 29, 2021 (CN) .......................... 202110129832.3

(51) Int. Cl.
G02B 21/18 (2006.01)
G02B 21/24 (2006.01)
(Continued)

(52) U.S. Cl.
CPC ........... G02B 21/245 (2013.01); G02B 21/18 (2013.01); G02B 21/26 (2013.01); G02B 21/34 (2013.01); G02B 21/361 (2013.01)

(58) Field of Classification Search
CPC ...... G02B 21/245; G02B 21/18; G02B 21/26; G02B 21/34; G02B 21/361
See application file for complete search history.

(56) References Cited

U.S. PATENT DOCUMENTS 6,307,636 B1 10/2001 Spink
6,982,431 B2 * 1/2006 Modlin .............. G01N 21/6452
250/225

(Continued)

FOREIGN PATENT DOCUMENTS

CN 101900875 A 12/2010
CN 103033919 A 4/2013
(Continued)

OTHER PUBLICATIONS

International Search Report in PCT/CN2021/130342 mailed on Feb. 16, 2022, 8 pages.
(Continued)

*Primary Examiner* — Mustak Choudhury
(74) *Attorney, Agent, or Firm* — METIS IP LLC

(57) ABSTRACT

The present disclosure disclose a microscopic device and a focusing method of the microscopic device, the microscopic device includes an object stage configured to carry a transparent carrier and drive the transparent carrier to translate along at least one direction, the transparent carrier includes at least two object positions; a microscopic objective located on a side of the object stage; a rangefinder located on a same side of the object stage as a microscopic objective and at a same height relative to the object stage, and the rangefinder is configured to measure a distance between a surface of each of the at least two object positions and the microscopic objective; a focusing module configured to adjust a position of the microscopic objective along a first direction based on the distance measured by the rangefinder, wherein the first direction is perpendicular to a carrying surface of the object stage.

20 Claims, 8 Drawing Sheets

(51) Int. Cl.
    G02B 21/26     (2006.01)
    G02B 21/34     (2006.01)
    G02B 21/36     (2006.01)

(56)             References Cited

U.S. PATENT DOCUMENTS

| | | | |
|---|---|---|---|
| 2011/0102572 A1 | 5/2011 | Kihara et al. | |
| 2012/0019626 A1* | 1/2012 | Hou | G01N 21/9501 |
| | | | 348/136 |
| 2012/0307259 A1 | 12/2012 | Leung et al. | |
| 2015/0090908 A1 | 4/2015 | Lippert et al. | |
| 2015/0260504 A1 | 9/2015 | Schönleber et al. | |
| 2017/0318216 A1 | 11/2017 | Gladnick et al. | |
| 2019/0033568 A1 | 1/2019 | Li | |
| 2020/0030793 A1 | 1/2020 | Pastrana-Rios et al. | |

FOREIGN PATENT DOCUMENTS

| | | |
|---|---|---|
| CN | 103852878 A | 6/2014 |
| CN | 107883866 A | 4/2018 |
| CN | 109099859 A | 12/2018 |
| CN | 111220069 A | 6/2020 |
| CN | 111999878 A | 11/2020 |
| CN | 112051244 A | 12/2020 |
| CN | 112748564 A | 5/2021 |
| JP | 2010072017 A | 4/2010 |

OTHER PUBLICATIONS

Written Opinion in PCT/CN2021/130342 mailed on Feb. 16, 2022, 9 pages.

\* cited by examiner

20

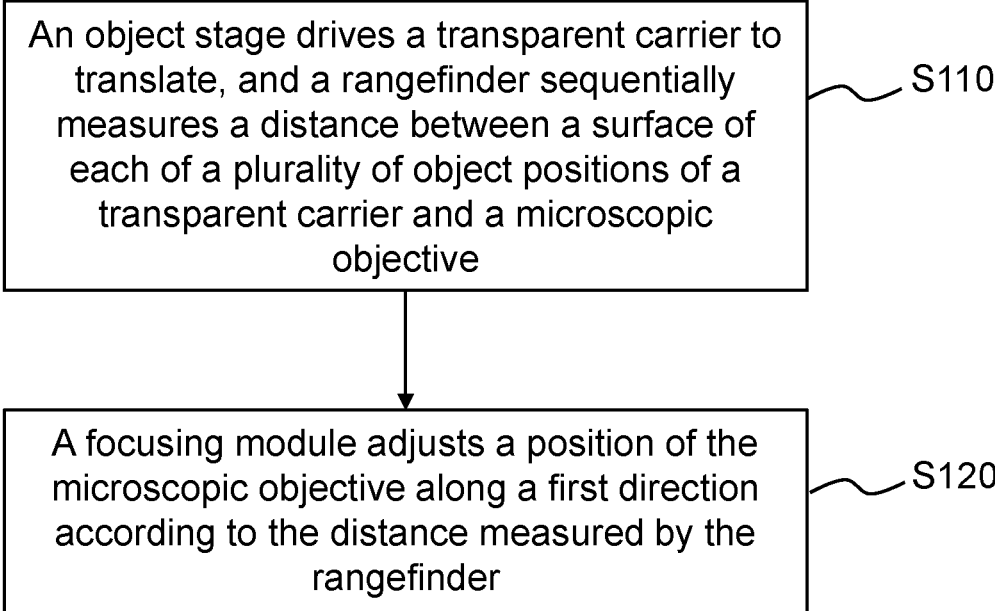

An object stage drives a transparent carrier to translate, and a rangefinder sequentially measures a distance between a surface of each of a plurality of object positions of a transparent carrier and a microscopic objective ⟋ S110

A focusing module adjusts a position of the microscopic objective along a first direction according to the distance measured by the rangefinder ⟋ S120

FIG. 7

MICROSCOPIC DEVICES AND FOCUSING METHODS THEREOF

CROSS-REFERENCE TO RELATED APPLICATIONS

This application is a Continuation of International Application No. PCT/CN2021/130342, filed on Nov. 12, 2021, which claims priority to Chinese Patent Application No. 202110129832.3 filed on Jan. 29, 2021, the entire contents of each of which are hereby incorporated by reference.

TECHNICAL FIELD

The embodiments of the present disclosure relate to the technical field of microscopy, and more particularly, to microscopic devices and focusing methods for the microscopic devices.

BACKGROUND

A microscope is an optical instrument composed of a lens or a combination of several lenses, which is mainly configured to magnify tiny objects for people to see them with naked eyes. As a microscopic observation device, the microscope is widely used in scientific research fields, industry fields, etc. Traditional microscopes, when observing objects on transparent carriers with certain deviations in thickness, have a problem of low operational efficiency because they cannot automatically, quickly, and accurately determine focal planes. When performing microscopic observations on objects on positions with different thicknesses, manual and slow focus adjustments are usually needed after each position movement.

SUMMARY

Embodiments of the present disclosure provide a microscopic device and a focusing method for the microscopic device, which may quickly and accurately determine a focal plane of a microscopic objective, thereby improving observation efficiency.

In the first aspect, the embodiments of the present disclosure provide a microscopic device, including:

An object stage configured to carry a transparent carrier, the transparent carrier includes at least two object positions, and the object stage is also configured to drive the transparent carrier to translate along at at least one direction.

A microscopic objective located on a side of the object stage.

A rangefinder located on the same side of the object stage as the microscopic objective, the rangefinder and the microscopic objective are located at a same height relative to the object stage, and the rangefinder is configured to measure a distance between a surface of each of the at least two object positions and the microscopic objective.

A focusing module configured to adjust a position of the microscopic objective along a first direction according to the distance measured by the rangefinder, and the rangefinder and the microscopic objective are both connected to a focusing module.

The first direction is perpendicular to a carrying surface of the object stage.

In the second aspect, the embodiments of the present disclosure provide a focusing method for a microscopic device, which is implemented by the microscopic device, the transparent carrier includes at least two object positions, and the focusing method for the microscopic device includes:

Driving, by the object stage, the transparent carrier to translate, and sequentially measuring, by the rangefinder, the distance between the surface of the each of the at least two object positions of the transparent carrier and the microscopic objective.

Adjusting, by the focusing module, the position of the microscopic objective along the first direction according to the distance measured by the rangefinder.

The first direction is perpendicular to the carrying surface of the object stage.

BRIEF DESCRIPTION OF THE DRAWINGS

FIG. 7 is a flowchart illustrating an exemplary focusing method for a microscopic device according to some embodiments of the present disclosure;

DETAILED DESCRIPTION

The present disclosure may be described in detail in conjunction with the drawings and embodiments hereinafter.

Figure 1:
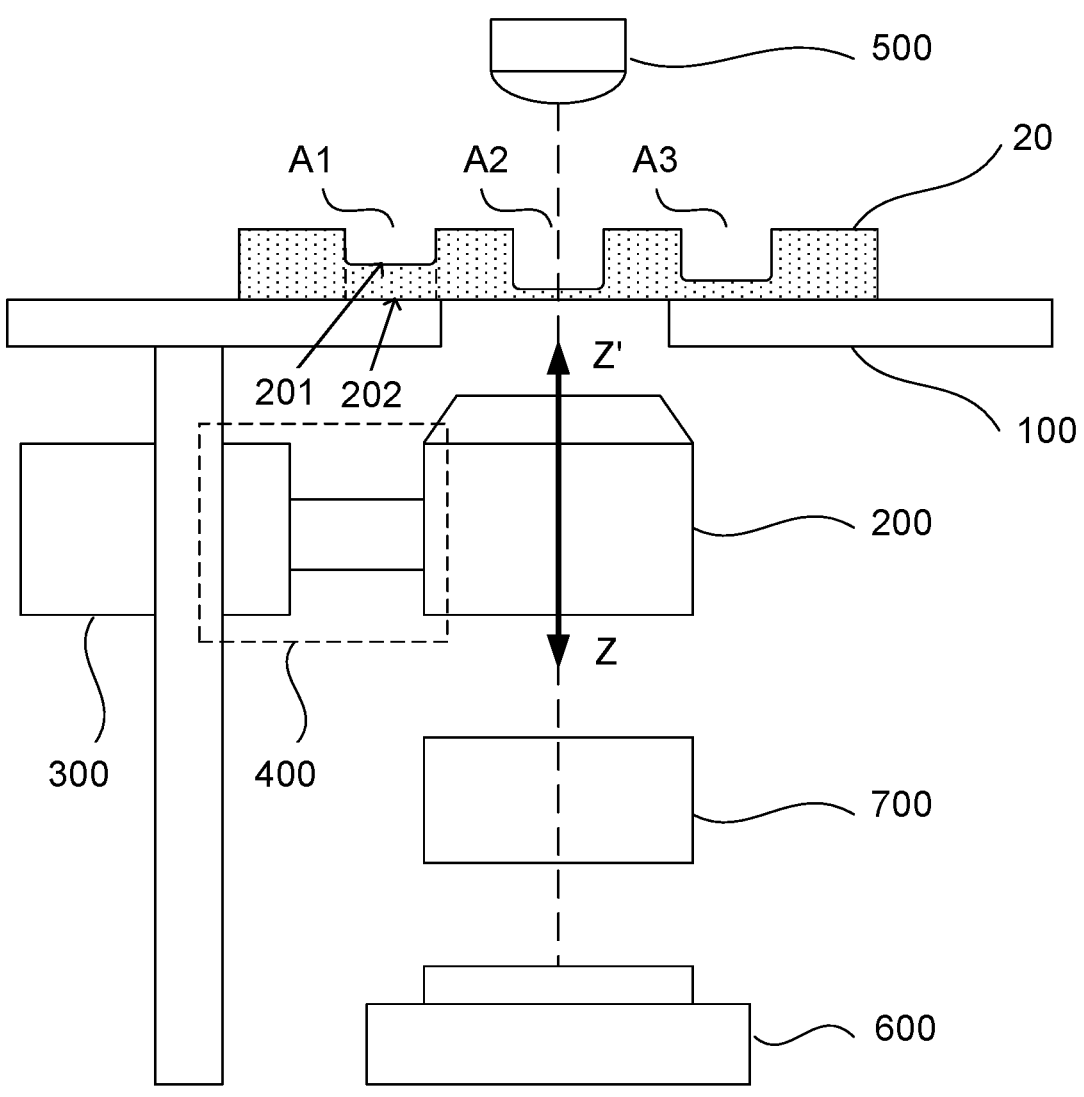
FIG. 1 is a schematic diagram illustrating an exemplary microscopic device according to some embodiments of the present disclosure.

FIG. 1 is a schematic diagram illustrating an exemplary microscopic device according to some embodiments of the present disclosure. As shown in FIG. 1, the microscopic device may include an object stage 100. The object stage 100 is configured to carry a transparent carrier 20. The transparent carrier 20 may include at least two object positions (object positions A1, A2, and A3 in three different positions as shown in FIG. 1). The object stage 100 may be also configured to drive the transparent carrier 20 to translate along at least one direction. A microscopic objective 200 may be located on a side of the object stage 100. A rangefinder 300 may be located on a same side of the object stage 100 as the microscopic objective 200. The rangefinder 300 and the microscopic objective 200 may be located at a same height relative to the object stage 100, and the rangefinder 300 may be configured to measure a distance between a surface of each of the at least two object positions and the microscopic objective 200. The focusing module 400, the rangefinder 300, and the microscopic objective 200 are all connected to the focusing module 400, and the focusing module 400 is configured to adjust a position of the microscopic objective 200 along a first direction according to the distance measured by the rangefinder 300. The first direction ZZ' is perpendicular to a carrying surface of the object stage 100. It should be noted that the "distance" mentioned in the present disclosure refers to a "vertical distance" except that it is clearly indicated as a "horizontal distance". For example, the distance between the surface of the each of the at least two object positions and the microscopic objective 200 measured by the rangefinder 300 is a vertical distance between the surface of the each of the plurality of object positions and the microscopic objective 200.

The transparent carrier 20 may be any solid with a transparent material that may carry an object to be measured and may make light pass through, such as transparent glass. In a production process of the transparent carrier 20, a height of the object position may be different due to a manufacturing process, etc., and there may be cases where heights of a plurality of object positions are different. According to FIG. 1, when microscopically observing objects placed on the plurality of object positions (A1, A2, and A3) of different heights of the transparent carrier 20, it is necessary to manually adjust the position of the microscopic objective 200 each time, making the focal plane of the microscopic objective 200 coincides with an upper surface of an object position being observed, so that a clear image of an object may be observed. Therefore, there may be a problem that the position of the microscopic objective 200 may not be determined quickly and accurately, causing low operation efficiency.

In the embodiments, in order to solve the above technical problem, the rangefinder 300 and the focusing module 400 are arranged on a side of the object stage 100 away from the transparent carrier 20 and on the same side as the microscopic objective 200. The rangefinder 300 and the microscopic objective 200 are at the same height relative to the object stage 100. The focusing module 400 is electrically connected to the rangefinder 300, and the focusing module 400 is also connected to the microscopic objective 200. The object stage 100 is configured to carry the transparent carrier 20 and drives the transparent carrier 20 to move in different directions on the carrying surface of the object stage 100 so that different object positions (A1, A2, and A3) of the transparent carrier 20 may move to a measurement position located on the object stage 100, and a central axis of the measurement position coincides with an optical axis of the rangefinder 300. The rangefinder 300 is configured to measure the vertical distance between each of the plurality of object positions (A1, A2, and A3) and the microscopic objective 200. The plurality of object positions of the transparent carrier 20 are sequentially moved to an observation position located on the object stage 100, and a central axis of the observation position coincides with an optical axis of the microscopic objective 200. The focusing module 400 adjusts the position of the microscopic objective 200 along the first direction ZZ' perpendicular to the carrying surface according to different vertical distances between the different object positions (A1, A2, and A3) and the microscopic objective 200 measured by the rangefinder 300, making the focusing plane of the microscopic objective 200 coincide with the upper surface of the object position being observed, so that a clear microscopic image of an object may be observed.

For exemplary, as shown in FIG. 1, a working process of the microscopic device provided in the embodiment includes: firstly, the object stage 100 drives an object position A1 of the transparent carrier 20 to move to the measurement position that is located on the object stage 100, and the central axis of the measurement position coincides with the optical axis of the rangefinder 300, and the rangefinder 300 measures a vertical distance L1 between the object position A1 and the microscopic objective 200, and the vertical distance L1 may be recorded and stored. The object stage 100 drives an object position A2 of the transparent carrier 20 to move to the measurement position, and the rangefinder 300 measures a vertical distance L2 between the object position A2 and the microscopic objective 200, and the vertical distance L2 may be recorded and stored. Similarly, the rangefinder 300 records and stores a vertical distance L3 between an object position A3 and the microscopic objective 200. Three data of L1, L2 and L3 may be recorded into a table. When objects are placed on the object positions A1, A2, and A3 of the transparent carrier 20, the object position A1 of the transparent carrier 20 is moved to the observation position that is located on the object stage 100, and the central axis of the observation position coincides with the optical axis of the object 200, and the microscopic objective 200 is adjusted to an optimal position to observe a clear image of an object on the object position A1. In a process of moving the object position A2 to the observation position, the focusing module 400 controls the microscopic objective 200 to move to the optimal position along ZZ' according to a distance difference value of L1 and L2; when the object position A2 is moved to the observation position, the focusing module 400 completes a focusing process, and a clear image of an object on the object position A2 may be directly observed. Similarly, in a process of moving the object position A3 to the observation position, the focusing module 400 controls the microscopic objective 200 to move to the optimal position along ZZ' according to a distance difference value of L2 and L3, that is, in the process that the object stage 100 drives the object positions of the transparent carrier 20 to move, the focusing process may be completed automatically. It may be understood that, when heights of two adjacent object positions are the same, the focusing module 400 does not need to adjust the position of the microscopic objective 200. The technical solution provided by the embodiment of the present disclosure may quickly and accurately determine the focal plane of the microscopic objective for transparent carriers of different thicknesses, thereby improving operating efficiency.

It should be noted that a measurement of a distance (such as L1, L2, and L3) between a surface of an object position and the microscopic objective may be stopped after the object stage drives the transparent carrier to move the each of the plurality of object positions of the transparent carrier to the measurement position sequentially, ensuring that the rangefinder measures the distance between the surface of the each of the plurality of object positions and the microscopic objective sequentially. Optionally, it is also possible for the object stage drives the transparent carrier to translate so that each of the plurality of object positions of the transparent carrier passes through the measurement position sequentially. For the each of the plurality of the object position, the rangefinder sequentially measures distance values of at least two positions on a surface of the each of the plurality of object positions and the microscopic objective, obtains at least two distance values, and determines the distance between the surface of the object position and the microscopic objective based on the at least two distance values. The specific determination manner may be found in FIG. 8 and the related descriptions thereof.

It should be noted that, according to FIG. 1, the optical axis of the rangefinder 300 and the optical axis of the microscopic objective 200 are parallel to each other. From a left view of FIG. 1, the optical axis of the rangefinder 300 coincides with the optical axis of the microscopic objective 200, the transparent carrier 20 is on the carrying surface of the object stage 100, and deviations of all object positions are the same at a same collinear point. By calculating the deviations between the plurality of object positions, errors in installing the microscopic device may be directly ignored.

Figure 2:
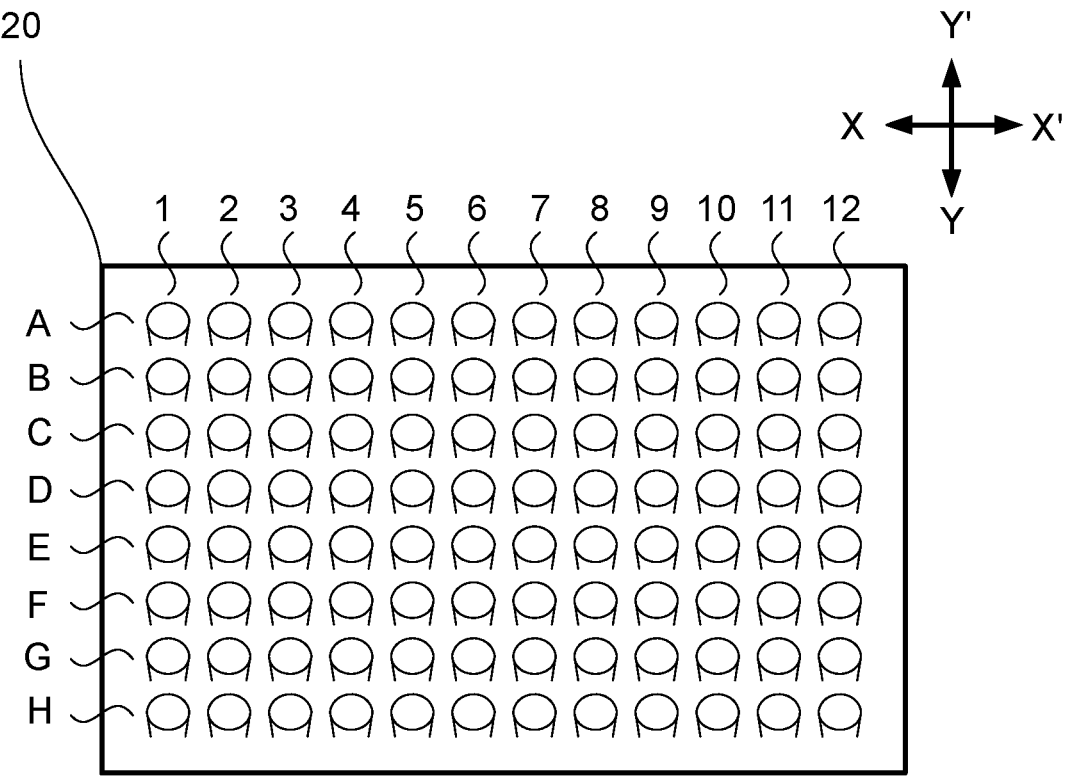
FIG. 2 is a schematic diagram illustrating an exemplary transparent carrier according to some embodiments of the present disclosure.

FIG. 2 is a schematic diagram illustrating an exemplary transparent carrier according to some embodiments of the present disclosure. Optionally, as shown in FIG. 2, the transparent carrier 20 may include a plurality of object positions (A1, A2, A3 . . . B1, B2, and B3, etc.) arranged in an array; the object stage 100 is configured to drive the transparent carrier 20 to translate along the second direction XX' or a third direction YY'; the second direction)(X' is parallel to a row direction of an array, and the third direction YY' is parallel to a column direction of the array. The transparent carrier 20 may be a transparent object with the plurality of object positions arranged in the array, the plurality of object positions may have different heights, and the object stage 100 may drive the transparent carrier 20 on a carrying surface to move along the second direction)(X' or the third direction YY' so that the rangefinder 300 may measure vertical distances between upper surfaces of all object positions and the microscopic objective 200. For example, the object stage 100 drives the transparent carrier 20 to move sequentially in a bow shape according to the row of the array of the object positions, so that centers of the object positions coincide with the center of the measurement position in turn, ensuring that the rangefinder 300 sequentially measures a distance between an upper surface of each of the plurality of object positions of the transparent carrier and the microscopic objective 200.

Optionally, as shown in FIG. 2, the transparent carrier 20 may include 96 object positions, and the object positions are arranged in an array of 8 rows (A, B, C, D, E, F, G, and H) and 12 columns (1, 2, 3, 4, 5, 6, 7, 8, 9, 10, 11, and 12).

It should be noted that the microscopic device provided in the embodiments of the present disclosure may be applied to a situation that the microscopic objective, the rangefinder, and the focusing module are on a side of the object stage away from the transparent carrier and a situation that the microscopic objective, the rangefinder, and the focusing module are on a side of the object stage away from the transparent carrier, that is, the microscopic objective may be located above or below the transparent carrier. Next, the two situations are described in detail.

Optionally, as shown in FIG. 1, the transparent carrier 20 may include a first surface 201 and a second surface 202. The object (which is not shown in FIG. 1) is in contact with the first surface 201, and the object stage 100 is in contact with the second surface 202. The microscope objective 200, the rangefinder 300, and the focusing module 400 are located on a side of the object stage 100 away from the transparent carrier 20, that is, the microscopic objective 200, the rangefinder 300, and the focusing module 400 are located below the transparent carrier 20.

When the rangefinder 300 is located below the transparent carrier 20, the rangefinder 300 illuminates the transparent carrier 20 from below the transparent carrier 20, light reaching the first surface 201 of the transparent carrier has a relatively low light intensity, and light reaching the second surface 202 has a relatively high light intensity. Therefore, a first distance between the second surface 202 and the microscopic objective 200 may be measured first, and then the first distance may be superposed with a thickness of the object position to obtain a vertical distance between the first surface 201 and the microscopic objective 200. Certainly, if the light reaching the first surface 201 of the transparent carrier has a high light intensity, the vertical distance between the first surface 201 and the microscopic objective 200 may also be directly measured. It may be understood that a thickness of the each of the plurality of object positions of the transparent carrier 20 may be obtained first. That is, a distance difference value between the first surface 201 and the second surface 202 of the each of the plurality of object positions may be obtained first, and the thickness of the each of the plurality of object positions of the transparent carrier 20 may be parameter data of the transparent carrier 20, and may be obtained from the manufacturer, and may also be measured by using the microscopic device provided in the embodiments of the present disclosure.

Exemplarily, as shown in FIG. 1, a working process of the microscopic device provided in the embodiment includes: first, the object stage 100 drives the object position A1 of the transparent carrier 20 to move to the measurement position, the rangefinder 300 measures a first distance between the second surface 202 of the object position A1 and the microscopic objective 200, obtains the vertical distance L1 between the first surface 201 of the object position A1 and the microscopic objective 200 according to the first distance and the thickness of the object position, and the vertical distance L1 may be recorded and stored. The object stage 100 drives the object position A2 of the transparent carrier 20 to move to the measurement position, the rangefinder 300 measures another first distance between the second surface 202 of the object position A2 and the microscopic objective 200, obtains the vertical distance L2 between the first surface 201 of the object position A2 and the microscopic objective 200 according to the first distance and thickness of the object position A2, and the vertical distance L2 may be recorded and stored. Similarly, the rangefinder 300 records and stores the vertical distance L3 between the first surface 201 of the object position A3 and the microscopic objective 200. The three data of L1, L2, and L3 are recorded into a table. When objects are placed on the object positions A1, A2, and A3 of the transparent carrier 20, the object position A1 of the transparent carrier 20 is moved to the observation position, and the microscopic objective 200 is adjusted to an optimal position so that a clear image of an object on the object position A1 is observed. In a process of moving the object position A2 to the observation position, the object position A1 is designated as a reference object position, and the focusing module 400 controls the microscopic objective 200 to move to an optimal position along ZZ' according to a distance difference value between L1 and L2. When the object position A2 is moved to the observation position, the focusing module 400 completes a focusing process, and a clear image of an object on the object position A2 may be directly observed. Similarly, in a process of moving the object position A3 to the observation position, the object position A2 may be designated as a reference object position, and the focusing module 400 controls the microscopic objective 200 to move to the optimal position along ZZ' according to a distance difference value between L2 and L3. The object position A1 may also be designated as a reference object position, and the focusing process may be performed according to a distance difference value between L1 and L3, that is, the focusing process may be automatically completed in the process of moving the object positions of the transparent carrier 20 by the object stage 100. It may be understood that, when heights of two adjacent object positions are the same, the focusing module 400 does not need to adjust a position of the microscopic objective 200.

Figure 3:
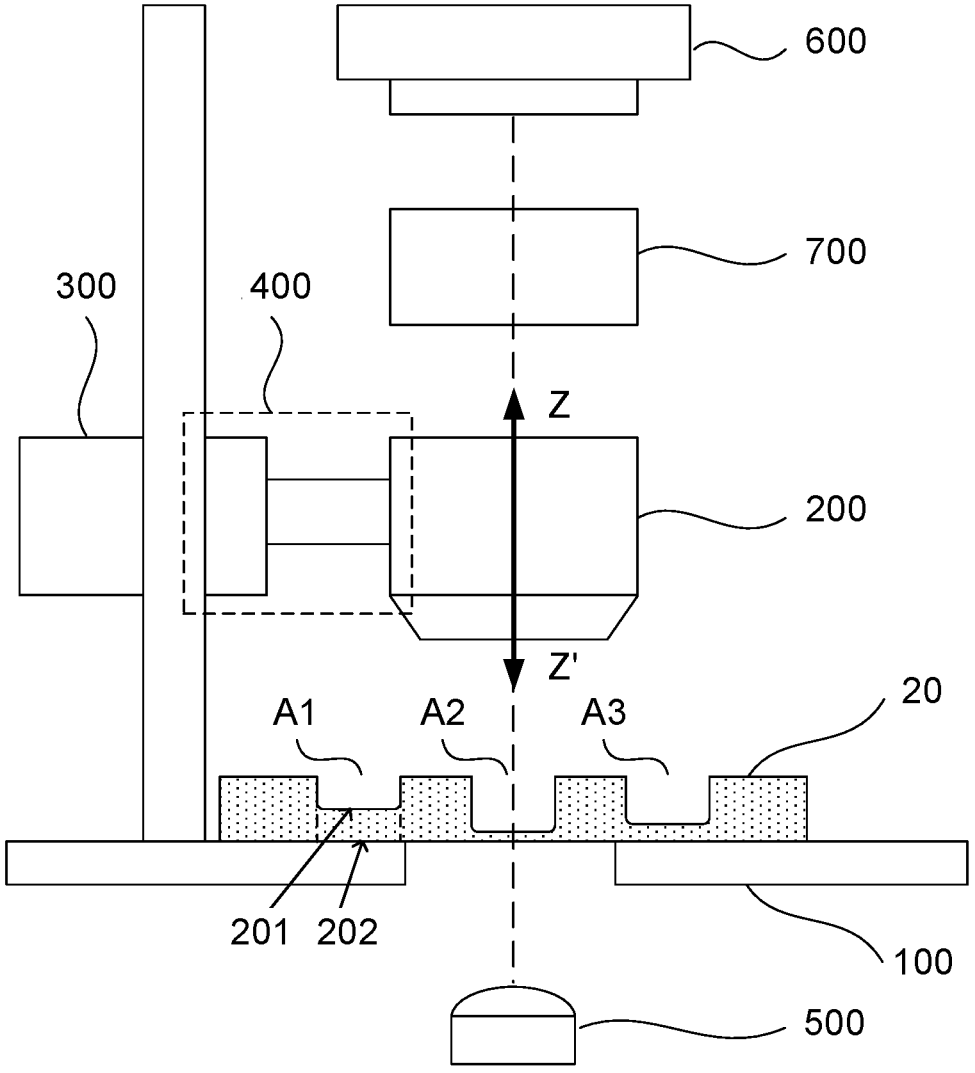
FIG. 3 is a schematic diagram illustrating an exemplary microscopic device according to some embodiments of the present disclosure.

FIG. 3 is a schematic diagram illustrating an exemplary microscopic device according to some embodiments of the present disclosure. Optionally, as shown in FIG. 3, the transparent carrier 20 includes the first surface 201 and the second surface 202. An object (which is not shown in FIG. 3) is in contact with the first surface 201, and the object stage 100 is in contact with the second surface 202. The microscopic objective 200, the rangefinder 300, and the focusing module 400 are located on a side of the transparent carrier 20 away from the object stage 100, that is, the microscopic objective 200, the rangefinder 300, and the focusing module 400 are located above the transparent carrier 20.

When the rangefinder 300 is located above the transparent carrier 20, the rangefinder 300 illuminates the transparent carrier 20 from above the transparent carrier 20, so that light reaching the first surface 201 of the transparent carrier has a relatively high light intensity, and a vertical distance between the first surface 201 and the microscopic objective 200 may be directly measured without obtaining thickness values of a plurality of object positions of the transparent carrier 20 in advance.

For example, as shown in FIG. 3, a working process of the microscopic device provided in the embodiment includes: first, the object stage 100 drives the object position A1 of the transparent carrier 20 to move to a measurement position, and the rangefinder 300 measures the vertical distance L1 between the first surface 201 of the object position A1 and the microscopic objective 200, and the vertical distance L1 may be recorded and stored. Then, the object stage 100 drives the object position A2 of the transparent carrier 20 to move to the measurement position, and the rangefinder 300 measures the vertical distance L2 between the first surface 201 of the object position A2 and the microscopic objective 200, and the vertical distance L2 may be recorded and stored. Similarly, the rangefinder 300 records and stores the vertical distance L3 between the first surface 201 of the object position A3 and the microscopic objective 200. The three data of L1, L2, and L3 are recorded into a table. When objects are placed on the object positions A1, A2, and A3 of the transparent carrier 20, the object position A1 of the transparent carrier 20 is moved to the observation position, and the microscopic objective 200 is adjusted to an optimal position, so that a clear image of an object on the object position A1 is observed. In a process of moving the object position A2 to the observation position, the object position A1 is designated as a reference object position, and the focusing module 400 controls the microscopic objective 200 to move to the optimal position along ZZ' according to a distance difference value between L1 and L2. When the object position A2 is moved to the observation position, the focusing module 400 completes a focusing process, and a clear image of an object on the object position A2 may be directly observed. Similarly, in a process of moving the object position A3 to the observation position, the object position A2 may be designated as a reference object position, and the focusing module 400 controls the microscopic objective 200 to move to the optimal position along ZZ' according to a distance difference value between L2 and L3. The object position A1 may also be designated as a reference object position, and the focusing process may be performed according to a distance difference value between L1 and L3, that is, the focusing process may be automatically completed in a process of moving the object positions of the transparent carrier 20 by the object stage 100. It may be understood that, when heights of two adjacent object positions are the same, the focusing module 400 does not need to adjust a position of the microscopic objective 200.

Figure 4:
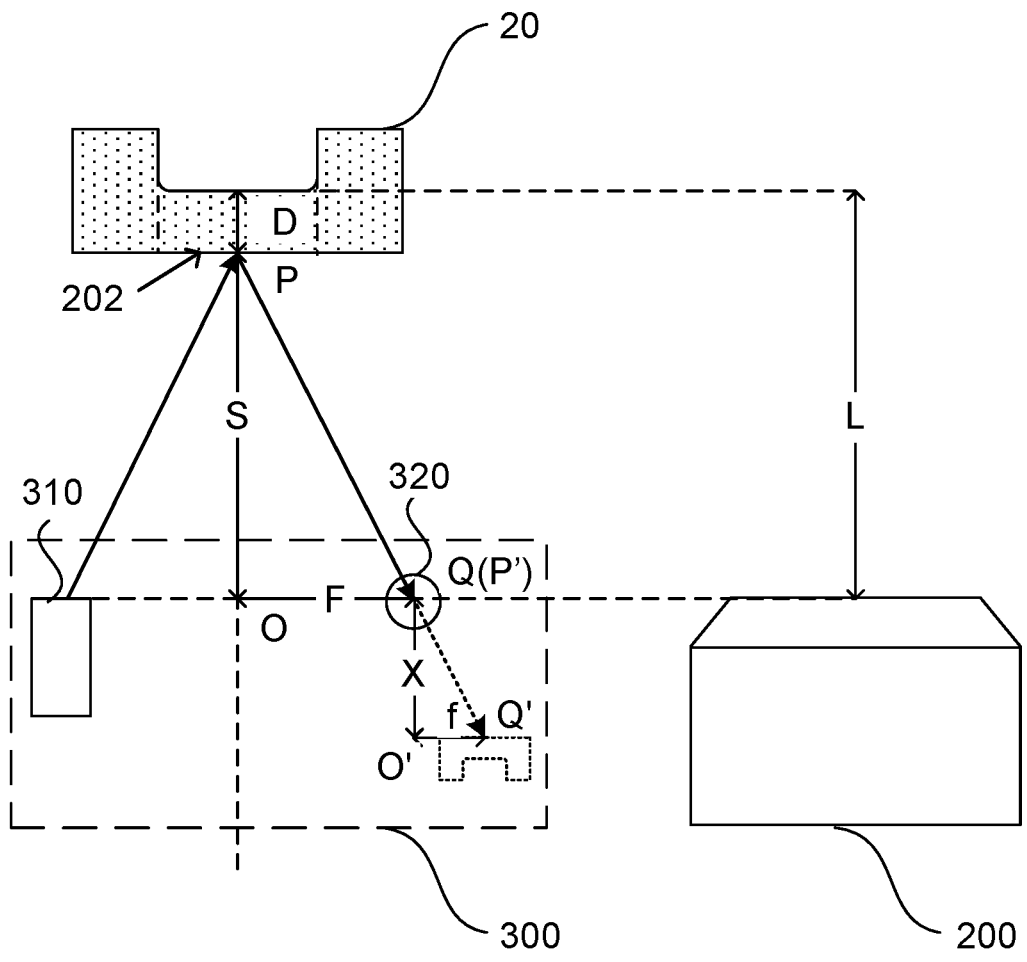
FIG. 4 is a schematic diagram illustrating a ranging principle of the microscopic device provided in FIG. 1.

FIG. 4 is a schematic diagram illustrating a ranging principle of the microscopic device provided in FIG. 1. Optionally, as shown in FIG. 4, the rangefinder 300 uses a laser triangulation ranging principle to measure a distance between a surface of each of a plurality of object positions and the microscopic objective 200.

Optionally, when the rangefinder 300 measures the distance between the surface of the each of the plurality of object positions and the microscopic objective 200, the object position and the rangefinder 300 have a common optical axis.

A ranging principle of the microscopic device provided in the embodiments of the present disclosure is a triangular ranging principle, and a direct laser triangulation ranging method or an oblique laser triangulation ranging method may also be used. Next, an exemplary oblique laser triangulation ranging method is described in detail. As shown in FIG. 4, an object position of the transparent carrier 20 is moved to a measurement position, that is, a central axis of the object position coincides with a central axis of the rangefinder 300 (i.e., an optical axis of the rangefinder 300). The rangefinder 300 may be a laser ranging sensor including a laser emitter 310, a laser receiver 320, and a microprocessor (which is not shown in FIG. 4), and the central axis of the rangefinder 300 is a central normal of a connection line between the laser emitter 310 and the laser receiver 320. The laser emitter 310 emits a laser beam to an upper surface of the object position of the transparent carrier 20, the second surface 202 of the object position reflects the laser beam, and the laser receiver 320 receives the laser beam reflected by the second surface 202 of the object position. The microprocessor may be a single-chip microcomputer with functions of calculation, processing, and storage, the microprocessor is configured to calculate a first distance S between the second surface 202 of the object position of the transparent carrier and the microscopic objective 200 according to the laser triangulation ranging principle and to calculate a vertical distance L between the first surface 201 of the object position and the microscopic objective according to the first distance S and a thickness D of the object position. Exemplarily, the transparent carrier 20 is imaged in the laser receiver 320, a focal length of a formed image is f, a vertical distance between the formed image and the laser receiver 320 is x, and a horizontal distance between the laser receiver 320 and a normal of the rangefinder 300 is F. It may be seen from a triangle similarity principle that a triangle OPQ is similar to a triangle O'P'Q', therefore, the first distance S between the second surface 202 of the object position of the transparent carrier 20 and the microscopic objective 200 may be calculated according to the following formula 1:

$$\frac{S}{F} = \frac{x}{f}, \qquad\qquad \text{formula one}$$

Figure 5:
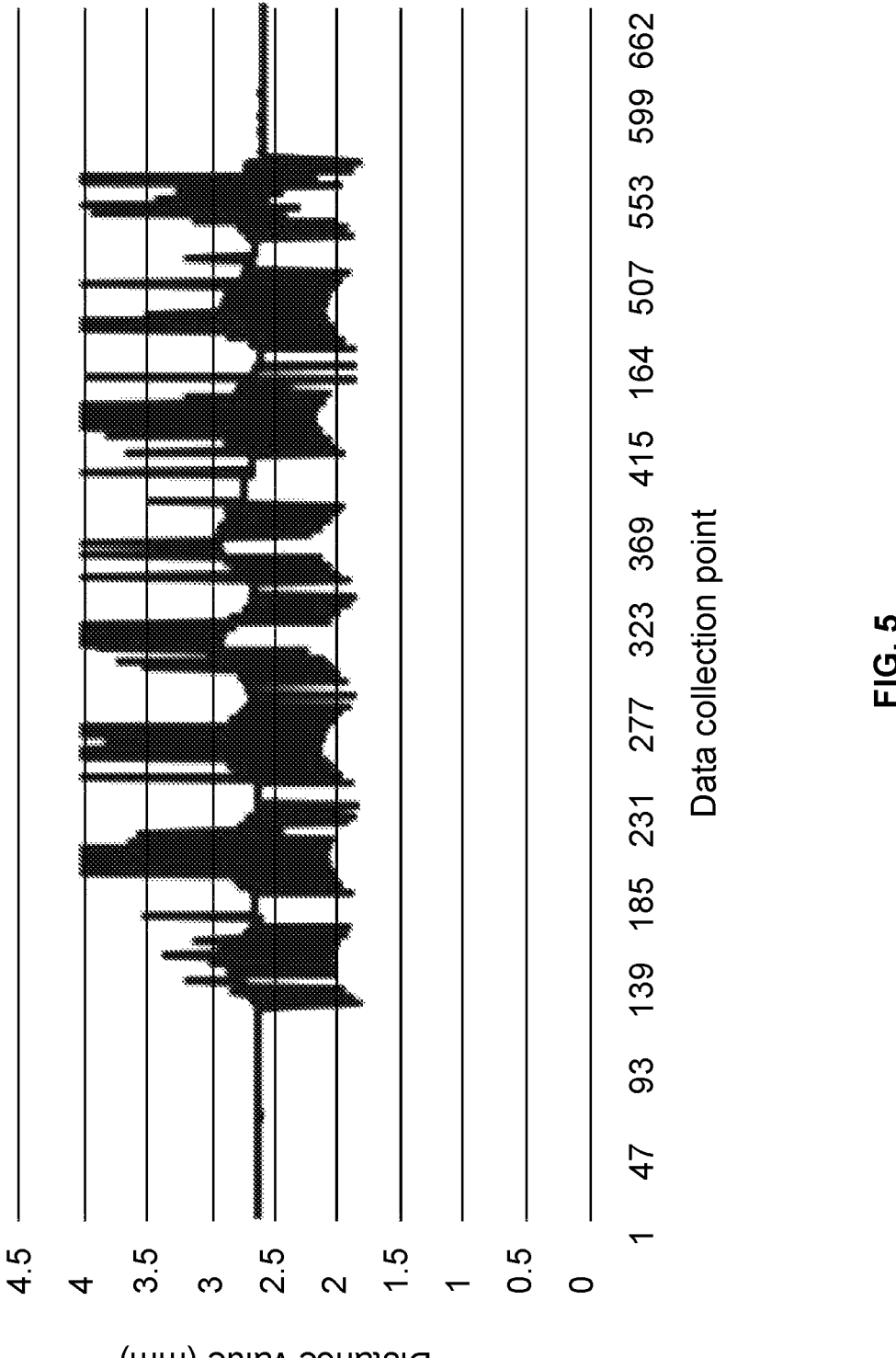
FIG. 5 is a data diagram illustrating vertical distances between first surfaces of a plurality of object positions of the transparent carrier provided in FIG. 2 and a microscopic objective.
Figure 6:
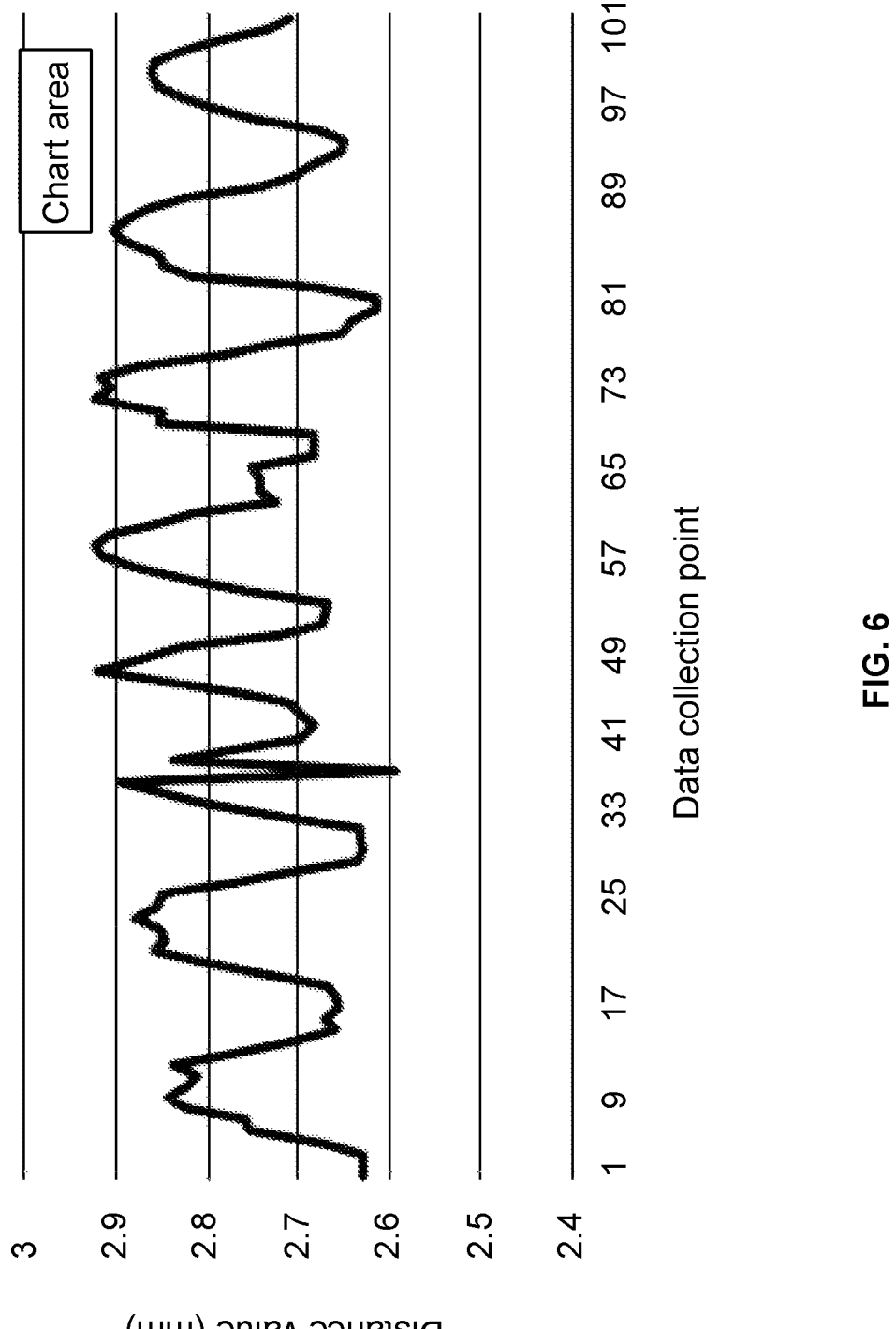
FIG. 6 is a data diagram illustrating a result of the vertical distances between the first surfaces of the plurality of object positions of the transparent carrier and the microscopic objective provided in FIG. 5.

Exemplarily, FIG. 5 is a data diagram illustrating vertical distances between first surfaces of a plurality of object positions of the transparent carrier provided in FIG. 2 and a microscopic objective. As shown in FIG. 5, the object stage 100 drives the transparent carrier 20 to move sequentially in a bow shape according to rows of an array of the plurality of object positions, and the rangefinder 300 collects distance data every 250 ms. Burr peaks in FIG. 5 are the vertical distances between parts that pass through the plurality of object positions during a test and the microscopic objective 200. By setting filtering deviation and a standard range, error data exceeding the standard range may be deleted, and then an average value of measured data per second is calculated to remove measurement values of a switching interval (i.e., time for changing lines), so as to obtain the vertical distances between upper surfaces (i.e., first surfaces) of the plurality of object positions and the microscopic objective 200. FIG. 6 is a data diagram illustrating a result of the vertical distances between the first surfaces of the plurality of object positions of the transparent carrier and the microscopic objective provided in FIG. 5. Table 1 is a data table of the vertical distances between the first surfaces of the plurality of object positions of the transparent carrier and the microscopic objective provided in FIG. 6. When objects are placed on all object positions of the transparent carrier 20, the object position A1 of the transparent carrier 20 is moved to an observation position, and the microscopic objective 200 is adjusted to an optimal position, so that a clear image of an object on the object position A1 may be observed. In a process of moving the object position A2 to the observation position, the rangefinder controls the focusing module 400 to drive the microscopic objective 200 to move to the optimal position according to a distance difference value between L1 and L2 (i.e., 2.62934-2.67148). When the object position A2 is moved to the measurement position, the focusing module 400 completes a focusing process, and a clear image of an object on the object position A2 may be directly observed. Similarly, microscopic observations of the objects on the all object positions may be quickly completed. It should be noted that if a distance value of a next object position is greater than a distance value of a previous object position, it indicates that a height of the next object position is greater than a height of the previous object position. Therefore, it is necessary for the microscopic objective to move by a distance difference value (i.e., a difference value between a vertical distance between an upper surface of the next object position and the microscopic objective, and a vertical distance between an upper surface of the previous object position and the microscopic objective) along a first direction ZZ' to a direction close to the object stage 100. If the distance value of the next object position is less than the distance value of the previous object position, it indicates that the height of the next object position is lower than the height of the previous object position. Therefore, it is necessary for the microscopic objective 200 to move by a distance difference value, along the first direction ZZ' to a direction away from the object stage 100.

TABLE 1

Vertical distances between the first surfaces of the plurality of object positions of the transparent carrier and the microscopic objective provided in FIG. 6

|   | 1 | 2 | 3 | 4 | 5 | 6 |
|---|---|---|---|---|---|---|
| A | 2.62934 | 2.67148 | 2.75543 | 2.82174 | 2.84494 | 2.82289 |
| B | 2.63587 | 2.70921 | 2.77144 | 2.84837 | 2.85474 | 2.87826 |
| C | 2.63097 | 2.71166 | 2.7979 | 2.84886 | 2.89492 | 2.59308 |
| D | 2.87826 | 2.814887 | 2.75086 | 2.668867 | 2.672133 | 2.674093 |
| E | 2.9155 | 2.92432 | 2.90913 | 2.85425 | 2.812927 | 2.7244 |
| F | 2.614313 | 2.613333 | 2.64061 | 2.653513 | 2.73175 | 2.78516 |
| G | 2.680627 | 2.81799 | 2.84886 | 2.85131 | 2.891 | 2.902107 |
| H | 2.71068 | 2.73224 | 2.78614 | 2.8273 | 2.85964 | 2.86258 |

TABLE 1-continued

Vertical distances between the first surfaces of the plurality of object positions of the transparent carrier and the microscopic objective provided in FIG. 6

|   | 7 | 8 | 9 | 10 | 11 | 12 |
|---|---|---|---|---|---|---|
| A | 2.81113 | 2.75772 | 2.83803 | 2.75821 | 2.70022 | 2.66005 |
| B | 2.85376 | 2.84788 | 2.85964 | 2.80672 | 2.74792 | 2.66854 |
| C | 2.83612 | 2.77242 | 2.69892 | 2.68275 | 2.697287 | 2.70872 |
| D | 2.72293 | 2.82436 | 2.87532 | 2.92138 | 2.84788 | 2.7685 |
| E | 2.74302 | 2.74302 | 2.74988 | 2.68177 | 2.68422 | 2.681607 |
| F | 2.8763 | 2.91942 | 2.90472 | 2.92432 | 2.84886 | 2.85278 |
| G | 2.888387 | 2.862907 | 2.82289 | 2.74106 | 2.704147 | 2.68618 |
| H | 2.85474 | 2.8273 | 2.79202 | 2.74694 | 2.67981 | 2.650573 |

Optionally, as shown in FIG. 1 and FIG. 3, the microscopic device may further include a microscopic light source 500 located on a side of the object stage 100 away from the microscopic objective 200. The microscopic light source 500 may be a natural light source such as sunlight in the environment, or an artificial light source such as a Light-Emitting Diode (LED) lamp, a fluorescent lamp, etc. The microscopic light source 500 is configured to provide suitable brightness when microscopically observing the objects on the plurality of object positions of the transparent carrier 20.

Optionally, as shown in FIG. 1 and FIG. 3, the microscopic device may further include an imaging camera 600 located on a side of the microscopic objective 200 away from the object stage 100. The imaging camera 600 may be an optical instrument combined with a microscope to obtain microscopic imaging images. The imaging camera 600 is configured to directly capture clear images of objects when microscopically observing the objects on the plurality of object positions of the transparent carrier 20.

Optionally, the imaging camera 600 may include a charge-coupled device (CCD) or a complementary metal oxide semiconductor (CMOS). The CCD also known as a CCD image sensor, is a semiconductor device that converts optical images into digital signals. The CMOS is a sensor that is usually ten times less sensitive than the CCD image sensor. Semiconductors with N (negatively charged) electrodes and P (positively charged) electrodes coexist in the CMOS by using semiconductors made with silicon and germanium, and currents generated by the two complementary effects may be recorded and interpreted as images by a processing chip.

Optionally, as shown in FIG. 1 and FIG. 3, the microscopic device may further include a tube lens 700 located between the microscopic objective 200 and the imaging camera 600. The tube lens 700 may be a lens group composed of a plurality of lenses located between the microscopic objective 200 and the imaging camera 600, which is configured to perform a collimation operation and a focusing operation on a clear image of an object observed by the microscopic objective 200 for the convenience of the imaging camera 600 to capture images.

The microscopic device provided in the embodiments of the present disclosure is configured to microscopically observe objects on the transparent carrier, and the transparent carrier includes at least two object positions. The rangefinder and the microscopic objective are arranged on a same side of the object stage and are located at a same height relative to the object stage, and the focusing module is connected with the rangefinder and the microscopic objective. The object stage carries and drives the transparent carrier to move along at least one direction, the rangefinder measures a distance between a surface of each of the at least two object positions of the transparent carrier and the microscopic objective, and the focusing module adjusts a position of the microscopic objective along a first direction vertical to a carrying surface on the object stage according to the distance measured by the rangefinder, so that the focal plane of the object stage may be determined quickly and accurately to improve operation efficiency.

The embodiments of the present disclosure also provide a focusing method for a microscopic device, which is implemented by the microscopic device described in any of the above-mentioned embodiments. FIG. 7 is a flowchart illustrating a focusing method for a microscopic device provided in the embodiments of the present disclosure. As shown in FIG. 7, the focusing method for the microscopic device includes:

In S110, an object stage drives a transparent carrier to translate, and a rangefinder sequentially measures a distance between a surface of each of a plurality of object positions of a transparent carrier and a microscopic objective.

The transparent carrier includes at least two object positions, and the object stage carries the transparent carrier and drives the transparent carrier to move in different directions on a carrying surface of the object stage, so that different object positions of the transparent carrier sequentially move to a measurement position located on the object stage, and a central axis of the measurement position coincides with an optical axis of the rangefinder. The rangefinder obtains a vertical distance between an upper surface of the each of the plurality of object positions and the microscopic objective through measurement and calculation.

Optionally, the object stage drives the transparent carrier to translate, and there are two manners for the rangefinder to sequentially measure the distance between the surface of the each of the plurality of object positions of the transparent carrier and the microscopic objective, that is, S110 may include S1101 and S1102:

In S1101, the object stage drives the transparent carrier to translate, so that the each of the plurality of object positions of the transparent carrier sequentially moves to the measurement position and then stops, ensuring that the rangefinder sequentially measures the distance between the surface of the each of the plurality of object position of the transparent carrier and the microscopic objective.

Optionally, the transparent carrier may include the plurality of object positions arranged in an array; the object stage drives the transparent carrier to move sequentially in a bow shape according to rows formed by the plurality of object positions, making the plurality of object positions sequentially correspond to the rangefinder, so that the rangefinder sequentially measures the distance between the surface of the each of the plurality of object position of the transparent carrier and the microscopic objective.

In S1102, the object stage drives the transparent carrier to translate so that the each of the plurality of object positions of the transparent carrier passes through the measurement position in turn; for the each of the plurality of object positions, the rangefinder sequentially measures distance values between at least two positions on the surface of the each of the plurality of object positions and the microscopic objective to obtain at least two distance values, and determines a distance between a surface of an object position and the microscopic objective based on the at least two distance values.

For an object position, the rangefinder may obtain distance values between at least two positions on a surface of the object position and the microscopic objective, and then a microprocessor in the rangefinder may calculate to determine a distance between the surface of the object position and the microscopic objective according to the obtained distance values between the at least two positions on the surface of the object position and the microscopic objective. A distance between an upper surface of the object position and the microscopic objective obtained in this manner is more precise.

Optionally, the determining a distance between a surface of an object position and the microscopic objective based on the at least two distance values comprising:

Process 1: designating an average value of the at least two distance values as the distance between the surface of the object position and the microscopic objective. Exemplarily, as shown in FIG. 5, the object stage drives the transparent carrier at a speed of 9 mm/s to move sequentially in a bow shape according to the rows of the array of the plurality of object positions, and the rangefinder collects distance data every 250 ms; burr peaks in FIG. 5 are the vertical distances between parts that pass through the plurality of object positions and the microscopic objective 200 during a test; by setting filtering deviation and a standard range, error data exceeding the standard range may be deleted, and then an average value of data measured per second is calculated to remove measurement values of a switching interval (i.e., time for changing lines), so as to obtain the vertical distances between the upper surfaces (i.e., first surfaces) of the plurality of object positions and the microscopic objective 200.

Process 2: the distance between the surface of the object position and the microscopic objective may be calculated according to the following formula 2:

$$c = c_1 + \frac{(c_2 - c_1) \times (t - t_1)}{t_2 - t_1}, \qquad \text{formula two}$$

Where c denotes a calculated value of the distance between the surface of the object position and the microscopic objective, c1 denotes a measured distance value between the surface of the object position and the microscopic objective at time t1, and c2 denotes a measured distance value between the surface of the object position and the microscopic objective at time t2, t denotes a moment corresponding to a moment when c is calculated, and t1

Figure 8:
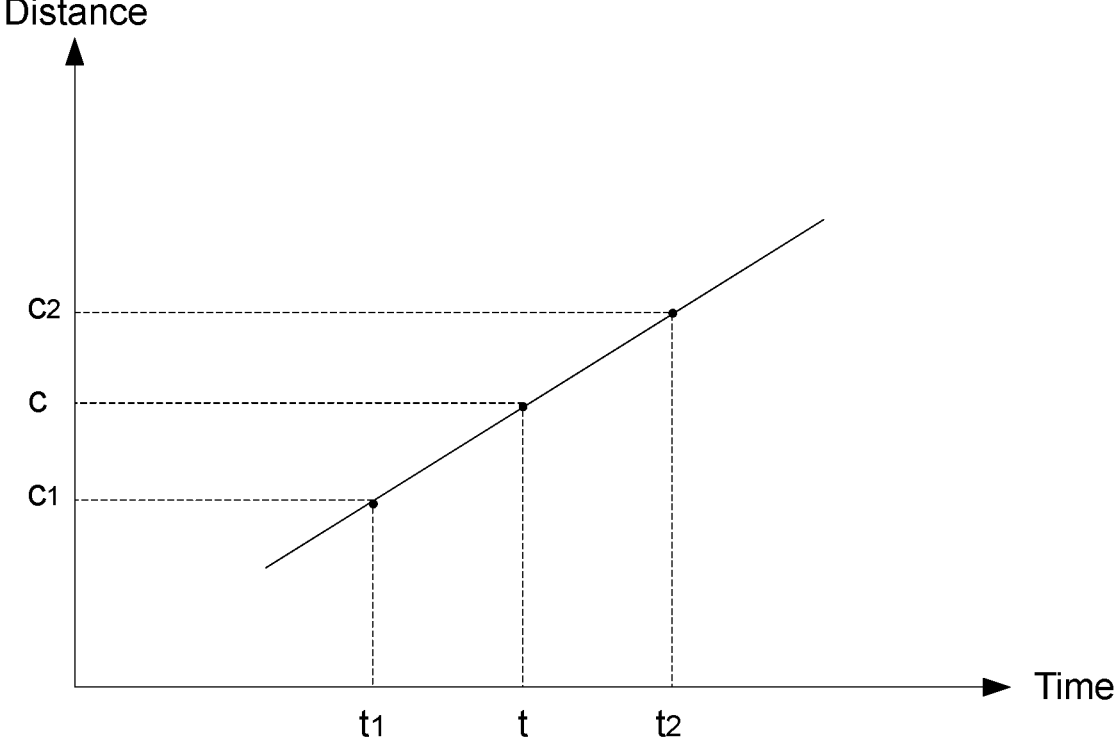
FIG. 8 is a schematic diagram illustrating a relationship between at least two distance values and time according to some embodiments of the present disclosure.

By using Process 2, distance values between a plurality of positions on the upper surface of the object position and the microscopic objective may be obtained first, and a time distance image may be obtained. FIG. 8 is a schematic diagram illustrating a relationship between at least two distance values and time provided in the embodiments of the present disclosure. As shown in FIG. 8, a distance measurement value between a surface of an object position and a microscopic objective at time t1 is c1, a distance measurement value between a surface of an object position and the microscopic objective at time t2 is c2, and a calculated distance value between a surface of an object position and the microscopic objective at time t is c2, wherein t1<t<t2. It should be noted that the embodiments of the present disclosure do not limit the distance value selected. Two distance values are exemplarily selected to determine a distance between a surface of an object position and the microscopic objective in FIG. 8, and positions of the distance values selected are not limited, that is, the selection of time t1 and time t2 may be free and flexible, and may also be infinitely close to time t.

It should be noted that the focusing method for the microscopic device provided in the embodiments of the present disclosure may be applied to a situation that the microscopic objective, a rangefinder, and a focusing module are on a side of the object stage away from a transparent carrier, and may also be applied to a situation that the microscopic objective, the rangefinder, and the focusing module are on a side of the transparent carrier away from an object stage, that is, the microscopic objective may be above or below the transparent carrier. Next, the two situations are described in detail.

Optionally, the transparent carrier may include a first surface and a second surface, the object is in contact with the first surface, and the object stage is in contact with the second surface. The microscopic objective, the rangefinder, and the focusing module are located on a side of the object stage away from the transparent carrier. The rangefinder measures a first distance between the second surface and the microscopic objective, and obtains a distance between the first surface and the microscopic objective according to the first distance and a thickness of the transparent carrier.

When the rangefinder is located below the transparent carrier, the rangefinder illuminates the transparent carrier from below the transparent carrier, light reaching the first surface of the transparent carrier has a relatively low light intensity, and light reaching the second surface has a relatively high light intensity. Therefore, the first distance between the second surface and the microscopic objective may be measured first, and then the first distance may be superposed with a thickness of the object position to obtain a vertical distance between the first surface and the microscopic objective. Certainly, if the light reaching the first surface of the transparent carrier has a high light intensity, the vertical distance between the first surface and the microscopic objective may also be directly measured. It may be understood that the thickness of each of a plurality of object positions of the transparent carrier, that is, a distance difference value between the first surface and the second surface of the each of the plurality of object positions, may be obtained first, and the thickness of the each of the plurality of object positions of the transparent carrier may be parameter data of the transparent carrier that may be obtained from the manufacturer, and may also be measured by using the microscopic device provided in the embodiments of the present disclosure.

Optionally, the transparent carrier may include the first surface and the second surface, the object is in contact with the first surface, and the object stage is in contact with the second surface. The microscopic objective, the rangefinder, and the focusing module are located on a side of the transparent carrier away from the object stage. The rangefinder measures the distance between the first surface and the microscopic objective.

When the rangefinder is located above the transparent carrier, the rangefinder illuminates the transparent carrier from above the transparent carrier, so that light reaching the first surface of the transparent carrier has a relatively high light intensity, and the vertical distance between the first surface and the microscopic objective may be directly measured without obtaining thickness values of the plurality of object positions in advance.

In S120, the focusing module adjusts a position of the microscopic objective along a first direction according to the distance measured by the rangefinder. The first direction is perpendicular to the carrying surface of the object stage.

The plurality of object positions of the transparent carrier is moved to an observation position located on the object stage and a central axis of the observation position coincides with an optical axis of the microscopic objective. The focusing module adjusts the position of the microscopic objective along the first direction perpendicular to the carrying surface according to different vertical distances between different object positions and the microscopic objective measured by the rangefinder, so that a focal plane of the microscopic objective coincides with an upper surface of an object position being observed to obtain a clear image of an object.

Optionally, the focusing module adjusts the position of the microscopic objective along the first direction according to the distance measured by the rangefinder, that is, S120 may include:

In S1201, a reference object position is determined, the reference object position is moved to the observation position, and the position of the microscopic objective may be adjusted along the first direction.

First, a reference object position may be selected and moved to the observation position, and the position of the microscopic objective may be adjusted to obtain a clear image of the reference object position.

In S1202, a distance difference value between a first distance and a second distance is determined based on the distance measured by the rangefinder. The first distance is a distance between a surface of the object position other than the reference object position and the microscopic objective, and the second distance is a distance between a surface of the reference object position and the microscopic objective. The position of the microscopic objective along the first direction is adjusted based on the distance difference value.

After obtaining a clear image of the reference object position, in a process of moving a next object position of the transparent carrier to the observation position, the rangefinder may automatically control the focusing module to change the position of the microscopic objective based on a distance difference value between a first distance and a second distance. The first distance is a distance between a surface of the next object position and the microscopic objective and the second distance is a distance between a surface of the reference object position and the microscopic objective. When the next object position is moved to the observation position, the focusing module just completes a focusing process on the microscopic objective, and a clear image of the next object position is observed directly. During specific implementation, the first object position may be designated as the reference object position, or an object position preceding the current object position may be designated as the reference object position, which may be selected according to actual conditions during specific implementation.

Optionally, a flatness of the transparent carrier is checked based on the distance between the surface of the object position of the transparent carrier and the microscopic objective measured by the rangefinder.

In the focusing method for the microscopic device provided in the embodiments of the present disclosure, the transparent carrier is driven to translate by the object stage, and the rangefinder sequentially measures the distance between the surface of each of the plurality of object positions of the transparent carrier and the microscopic objective. The focusing module adjusts the position of the microscopic objective along the first direction perpendicular to the carrying surface of the object stage according to the distance measured by the rangefinder, and may check the flatness of the transparent carrier while quickly and accurately determining the focal plane of the microscopic objective, thereby improving operation efficiency greatly.

What is claimed is:

1. A microscopic device, comprising:

an object stage configured to carry a transparent carrier, wherein the transparent carrier includes at least two object positions, and the object stage is configured to drive the transparent carrier to translate to move, so that each of the at least two object positions on the transparent carrier moves to a measurement position;

a microscopic objective located on a side of the object stage;

a rangefinder located on a same side of the object stage as the microscopic objective, wherein the rangefinder and the microscopic objective are located at a same height relative to the object stage, and the rangefinder is configured to measure a distance between a surface of each of the at least two object positions and the microscopic objective; and a focusing module configured to adjust a position of the microscopic objective along a first direction based on the distance measured by the rangefinder, wherein the rangefinder and the microscopic objective are both connected to the focusing module and the first direction is perpendicular to a carrying surface of the object stage.

2. The microscopic device according to claim 1, wherein the transparent carrier includes a plurality of object positions arranged in an array;

the object stage is configured to drive the transparent carrier to translate along a second direction or a third direction; and the second direction is parallel to a row direction of the array, and the third direction is parallel to a column direction of the array.

3. The microscopic device according to claim 2, wherein the transparent carrier includes ninety-six object positions, and the ninety-six object positions are arranged in an array of eight rows and twelve columns.

4. The microscopic device according to claim 1, wherein the transparent carrier includes a first surface and a second surface, an object is in contact with the first surface, and the object stage is in contact with the second surface; and the microscopic objective, the rangefinder, and the focusing module are located on a same side of the object stage.

5. The microscopic device according to claim 1, wherein the rangefinder measures the distance between the surface of the each of the at least two object positions and the microscopic objective by using a laser triangulation ranging principle.

6. The microscopic device according to claim 5, wherein the at least two object positions and the rangefinder have a common optical axis when the rangefinder measures the distance between the surface of the each of the at least two object positions and the microscopic objective.

7. The microscopic device according to claim 1, further comprising:

a microscopic light source located on a side of the object stage away from the microscopic objective;

an imaging camera located on a side of the microscopic objective away from the object stage; and a tube lens located between the microscopic objective and the imaging camera.

8. A focusing method of a microscopic device, wherein the focusing method is implemented by a microscopic device according to claim 1, a transparent carrier includes at least two object positions, and the focusing method of the microscopic device comprises:

driving, by an object stage, the transparent carrier to translate;

measuring, by a rangefinder, a distance between a surface of each of the at least two object positions of the transparent carrier and a microscopic objective; and adjusting, by a focusing module, a position of the microscopic objective along a first direction according to the distance measured by the rangefinder, wherein the first direction is perpendicular to a carrying surface of the object stage.

9. The focusing method of the microscopic device according to claim 8, wherein the driving, by the object stage, the transparent carrier to translate and measuring, by the rangefinder, the distance between the surface of the each of the at least two object positions of the transparent carrier and the microscopic objective comprises:

driving, by the object stage, the transparent carrier to translate to make the each of the at least two object positions of the transparent carrier move to a measurement position sequentially and then stop so that the rangefinder sequentially measures the distance between the surface of the each of the at least two object positions of the transparent carrier and the microscopic objective.

10. The focusing method of the microscopic device according to claim 8, wherein the driving, by the object stage, the transparent carrier to translate and measuring, by the rangefinder, the distance between the surface of the each of the at least two object positions of the transparent carrier and the microscopic objective comprises:

driving, by the object stage, the transparent carrier to translate to make the each of the at least two object positions of the transparent carrier pass through the measurement position sequentially; and for each of the at least two object positions, measuring, by the rangefinder sequentially, distance values from at least two positions on the surface of the object position to the microscopic objective to obtain at least two distance values and determine the distance between the surface of the object position and the microscopic objective based on the at least two distance values.

11. The focusing method of the microscopic device according to claim 10, wherein to determine the distance between the surface of the object position and the microscopic objective based on the at least two distance values, the focusing module is configured to:

determine the distance between the surface of the object position and the microscopic objective according to a following formula:

$$c = c_1 + \frac{(c_2 - c_1) \times (t - t_1)}{t_2 - t_1},$$

where c denotes a calculated value of the distance between the surface of the object position and the microscopic objective, c1 denotes a measured value of a distance between the surface of the object position and the microscopic objective at time t1, and c2 denotes a measured value of a distance between the surface of the object position and the microscopic objective at time t2, t denotes a moment when calculating c, and t1.

12. The focusing method of the microscopic device according to claim 8, wherein the transparent carrier includes a plurality of object positions arranged in an array; and the object stage drives the transparent carrier to move according to rows of the array formed by the plurality of object positions.

13. The focusing method of the microscopic device according to claim 8, wherein the adjusting, by the focusing module, the position of the microscopic objective along the first direction according to the distance measured by the rangefinder comprises:

determining a reference object position; moving the reference object position to an observation position; adjusting the position of the microscopic objective along the first direction; and determining a distance difference value between a first distance and a second distance based on the distance measured by the rangefinder, wherein the first distance is a distance between a surface of the object position other than the reference object position and the microscopic objective, and the second distance is a distance between a surface of the reference object position and the microscopic objective; and adjusting the position of the microscopic objective along the first direction based on the distance difference value.

14. The focusing method of the microscopic device according to claim 8, wherein the transparent carrier includes a first surface and a second surface, the object is in contact with the first surface, and the object stage is in contact with the second surface;

the microscopic objective, the rangefinder and the focusing module are located on the side of the object stage away from the transparent carrier; and the rangefinder measures a first distance between the second surface and the microscopic objective, and obtains a distance between the first surface and the microscopic objective based on the first distance and a thickness of the transparent carrier.

15. The focusing method of the microscopic device according to claim 8, wherein the transparent carrier includes a first surface and a second surface, an object is in contact with the first surface, and the object stage is in contact with the second surface;

the microscopic objective, the rangefinder, and the focusing module are located on a side of the transparent carrier away from the object stage; and the rangefinder measures a distance between the first surface and the microscopic objective.

16. The focusing method of the microscopic device according to claim 8, wherein a flatness of the transparent carrier is determined based on the distance between the surface of the each of the at least two object positions of the transparent carrier and the microscopic objective measured by the rangefinder.

17. The focusing method of the microscopic device according to claim 8, further comprises:

when the object is placed on a first object position, a second object position, and a third object position of the transparent carrier, respectively, moving the first object position to an observation position that is located on the object stage, wherein a central axis of the observation position coincides with the optical axis of the object;

adjusting the microscopic objective to an optimal position to observe a clear image of the object on the first object position;

controlling, by focusing module, the microscopic objective to move to the optimal position along the first direction according to a distance difference value of a first vertical distance and a second vertical distance in a process of moving the second object position to the observation position, wherein the first vertical distance is a distance between the first object position and the microscopic objective, and the second vertical distance is a distance between the second object position and the microscopic objective;

controlling, by focusing module, the microscopic objective to move to the optimal position along the first direction according to a distance difference value of the second vertical distance and a third vertical distance in a process of moving the third object position to the observation position, wherein the third vertical distance is a distance between the third object position and the microscopic objective.

18. The focusing method of the microscopic device according to claim 8, wherein an optical channel for measuring the distance between the surface of each of the at least two object positions and the microscopic objective is different from an optical channel for imaging an object by the microscopic device.

19. The microscopic device according to claim 1, wherein an optical channel for measuring the distance between the surface of each of the at least two object positions and the microscopic objective is different from an optical channel for imaging an object by the microscopic device.

20. The microscopic device according to claim 1, wherein a central axis of the measurement position coincides with an optical axis of the rangefinder, and the microscopic objective is located above or below the transparent carrier.

* * * * *